(No Model.)
J. W. KENEVEL.
APPARATUS FOR MANUFACTURING GAS.
No. 493,891. Patented Mar. 21, 1893.
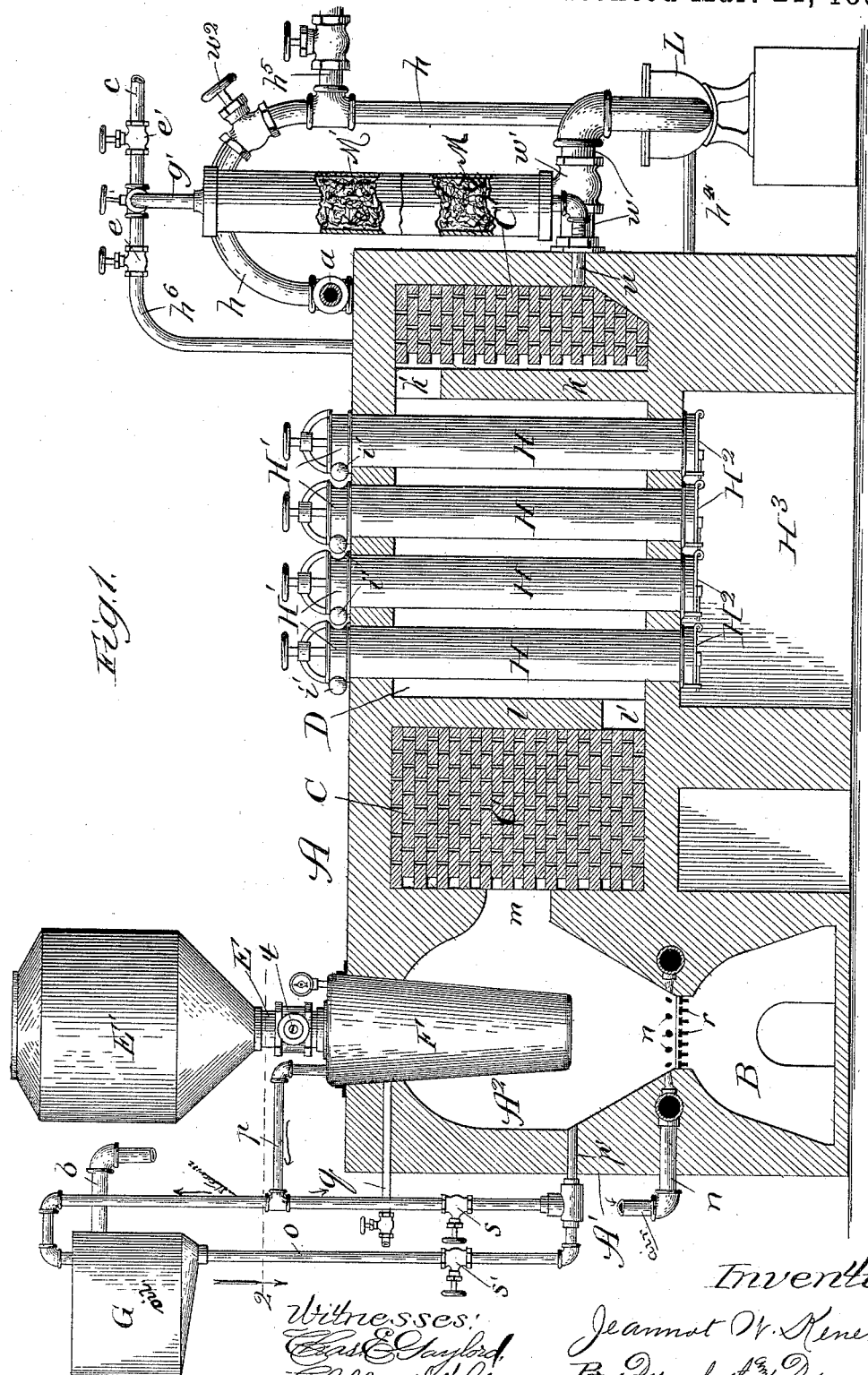

(No Model.)
J. W. KENEVEL.
APPARATUS FOR MANUFACTURING GAS.
No. 493,891.
Patented Mar. 21, 1893.
3 Sheets—Sheet 2.
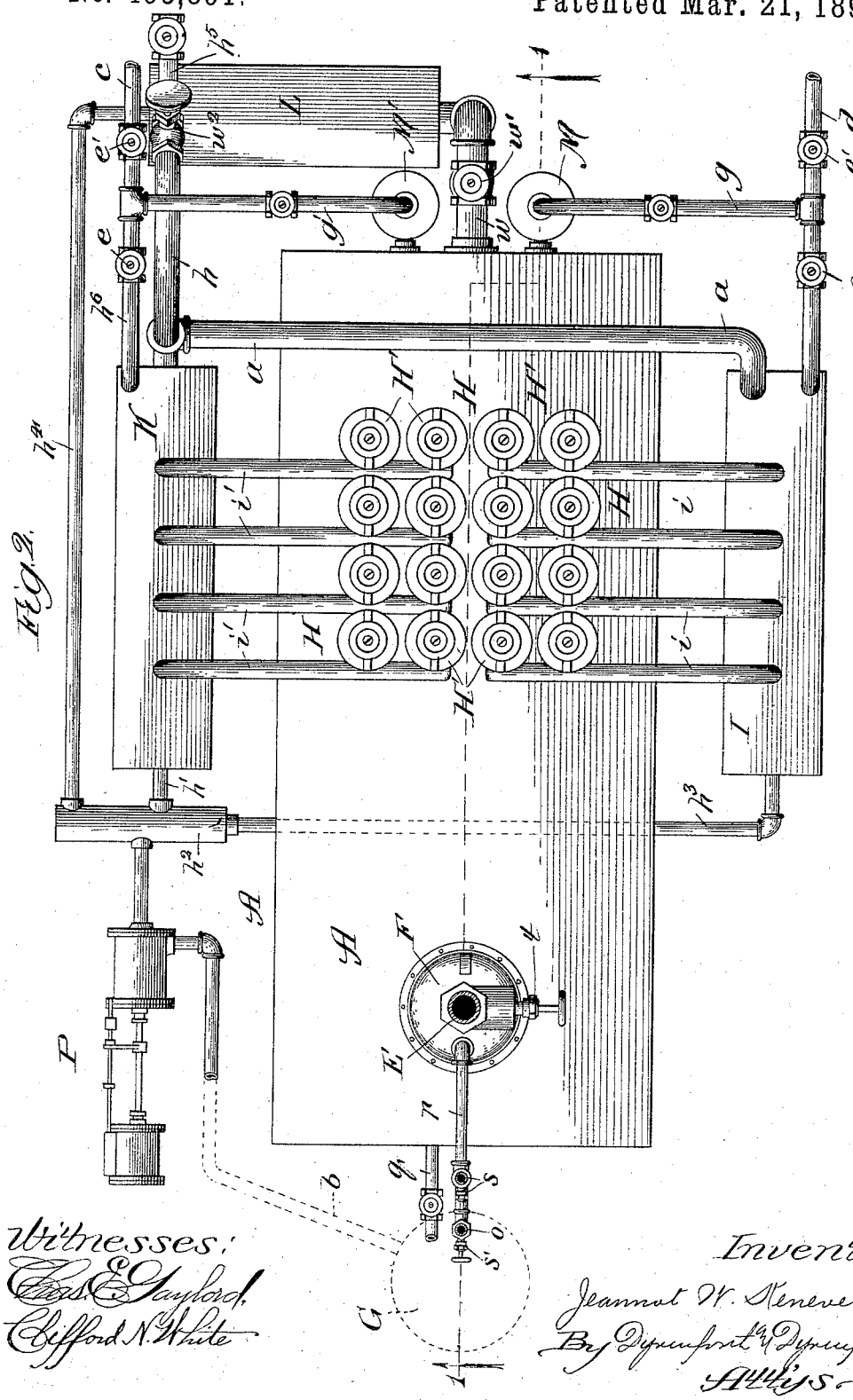

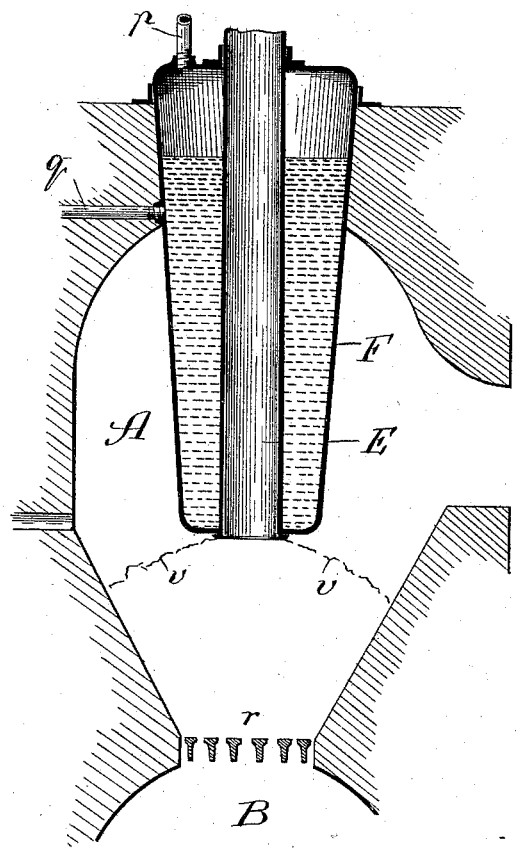

UNITED STATES PATENT OFFICE.

JEANNOT W. KENEVEL, OF CHICAGO, ILLINOIS.

APPARATUS FOR MANUFACTURING GAS.

SPECIFICATION forming part of Letters Patent No. 493,891, dated March 21, 1893.

Application filed April 25, 1892. Serial No. 430,531. (No model.)

*To all whom it may concern:*

Be it known that I, JEANNOT W. KENEVEL, a citizen of the United States, residing at Chicago, in the county of Cook and State of Illinois, have invented a new and useful Improvement in Apparatus for Manufacturing Gas, of which the following is a specification.

My invention relates to a new and improved apparatus for manufacturing gas for heating, or illuminating, or both, purposes.

The main objects of my improvement are to provide means for the production economically of gas, whether it be a heating-gas, an illuminating gas, or a compound of the two.

Generally stated, the proceeding for carrying out which my apparatus is adapted, is the following:

A gas is first generated by injecting steam, and afterward, preferably, with the steam, a hydro-carbon, into a mass, or into the products of combustion rising from a mass, of incandescent carbon (coke, coal); the resultant hydro-carbon gas in a highly heated condition is used for generating coal-gas, by heating therewith a retort, or series of retorts containing coal, which retort-gas and hydro-carbon gas are led off and cooled and purified, and then combined. Thus the product of the primary generation, which is deprived of a large portion of its carbon by consumption thereof under the great heat to which it is subjected on its way to the point of mixture, and which would, therefore, form a fuel gas, is bountifully enriched with carbon, by the mixture, thus greatly enhancing the illuminating quality of the compound and rendering it a gas of a high degree of illuminating power. The economy in the foregoing procedure lies not only in utilizing the heat of the primary generation for generating the retort-gas, whereby its own heat is materially reduced and it thus requires the less cooling down to a proper temperature for mixture with the coal, or retort, gas, but the residuum in the retort or retorts is coke, a marketable by-product.

I also provide means for saving and utilizing the coal-tar precipitation from the gas-products by passing them through hydraulic mains and supplying therefrom the precipitated coal-tar (hydro-carbon) to the primary generator.

My improved apparatus is also adapted for maintaining separate the product of the primary and that of the secondary or retort generation, whereby the former may afford a strictly fuel-gas while the latter may afford a strictly illuminating gas, both being simultaneously generated, the one by the other. And I still further provide means for the generation of hydrogen gas to be furnished from the apparatus, according to desire, either by itself, as a heating gas, or mixed with the coal-gas product of the retort, to greatly enhance the heating quality thereof.

My improved apparatus is represented in the accompanying drawings, in Figure 1, by a view in longitudinal sectional elevation, the section being taken on the line 1—1 in Fig. 2, and viewed in the direction of the arrows; in Fig. 2, by a plan view partly in section on the line 2 in Fig. 1 and regarded in the direction indicated by the arrow; and Fig. 3 is a broken view, enlarged, showing, in sectional elevation, the construction of the primary, or hydro-carbon-gas, generator.

$A'$ is the primary generator comprising a fuel-chamber $A^2$ over an ash-pit B from which it is separated by a suitable grate $r$, and built in a brick-structure A containing, besides, two heat-storage chambers C and $C'$, formed with fire-brick checker-work, or other suitable material, and, between the latter, a retort-chamber D. A magazine E (Fig. 3) leads downward into the generator-chamber $A^2$ from its top to or about to the line of the fuel-bed, $v$, from a hopper $E'$, for containing the supply of coal and communication of which with the magazine is controlled through the medium of a suitable valve indicated at $t$; and a steam-boiler, F, into which leads a valve-controlled water-supply pipe $q$, envelops the magazine and has a steam-outlet pipe $p$ branching downward, with a valve $s$ in the branch, and terminating at its lower end in a steam-jet $p'$, and branching upward into the top of a hydro-carbon or coal-tar holder G, from the base of which a discharge-pipe $o$, containing a valve $s'$, leads into the rear end of the steam-jet $p'$, which may thus be used to operate to inject the coal-tar supply into the generator A. Air-supply pipes, or tuyeres, $n$, lead into the base of the chamber A.

The generator-chamber $A^2$ communicates through a passage $m$ with the checker-chamber C, separated from the retort-chamber D by a diaphragm $l$, having an opening $l'$ at its base; the checker-chamber $C'$ being separated from the retort-chamber by a diaphragm $k$ having an opening $k'$ at its upper end.

H H are retorts, preferably of the cylindrical form illustrated and formed either of metal (cast iron) or of other suitable and more refractory material, and each being provided at both ends with caps H' and $H^2$, operating when closed to tightly seal the retorts, and being adapted to be readily removed, the former for permitting the retorts to be filled, and the latter for permitting the residuary contents (coke) to be discharged into a pit $H^3$ and saved. For a purpose hereinafter explained I prefer to provide the retorts in two series, each of which may consist of two rows, as represented in Fig. 2, the series on one side communicating from their upper ends through pipes $i$, connecting the retorts in transverse pairs, with one hydraulic main I, and the series on the opposite side similarly communicating, through pipes $i'$, with another hydraulic main K. By so dividing the retorts into sets, one set may be full of coal and having gas generated in it, while the other is being emptied of coke and refilled with coal, thereby avoiding the necessity for interrupting the desired continuity of the operation for replenishing purposes.

A third hydraulic main L is provided at the end of the apparatus containing the checker-chamber C', which communicates with that hydraulic main, at one end thereof, controllably through an outlet-pipe $w$ containing a valve $w'$. From the opposite end of the hydraulic-main L leads an ascension-pipe $h$ whence a descending continuation $h^6$ thereof leads into the adjacent end of the hydraulic main K, connected from its opposite end by a pipe $h'$ with a manifold $h^2$, which, in turn, is connected by a pipe $h^3$ with one end of the hydraulic-main I provided at its opposite end with a gas-outlet conduit $d$. The pipes $h'$ and $h^3$ form tar-overflow conduits from the respectic hydraulic mains to the manifold $h^2$, into which, also, leads an overflow-pipe $h^4$ from the hydraulic main L. A branch $a$ connects the ascension pipe $h$ with the hydraulic main I to lead into the latter the gas from the main L when the retorts on the side of the apparatus at which the main I is located, are in use; and suitable valves are shown to be provided to control the direction of the gas.

M and M' are hydrogen-generators in the form of cylindrical tanks or chambers containing charcoal and scrap-iron or other refractory material, such as limestone, flanking the pipe $w$ and connected from their bases, by valve-containing pipes $u$, with the checker-chamber C'. At their upper ends the generators M and M' communicate, respectively, through pipes $g$ and $g'$ with the outlet-pipes $d$ and $c$ of the hydraulic mains I and K between valves $e$ and $e'$ in each of the outlet-pipes.

The operation is as follows: A bed of coal in the generator A, is blasted with air through the tuyeres $n$, (which may, but not necessarily, continuously supply air to the base of the fuel-bed throughout the operation, but only in quantity to promote combustion to an extent that will maintain, against the cooling effect of the steam, the incandescent state of the fuel-bed required for continuity in the gas-making proceeding,) until it is raised to a state of high incandescence, the retorts H, or at least one set thereof having meantime been filled with suitable coal. The heat in the chamber $A^2$ generates steam in the boiler F, preparatorily filled with water through the pipe $q$, and which tends to prevent overheating, or heating to decomposition, of the coal-supply in the magazine E and hopper E'. When steam has been sufficiently generated in the magazine-shielding boiler F, but preferably not until it has been so superheated as to facilitate its decomposition by the heat in the chamber $A^2$, the valve $s$ is opened to admit steam into the generater A' and with it, if desired, by opening the valves $s'$, hydrocarbon from the holder G, the supply in which, if used (though it need not be) from the start, may be from a source extraneous to the apparatus, though I intend that thereafter the supply, if used, shall be from the coal-tar deposits in the several hydraulic mains, forced into the holder G through a pipe $b$ by a suitable pump P communicating with the manifold $h^2$. The products of combustion pass from the chamber $A^2$ through the passage $m$ into the heat-storage or checker chamber C, heating it eventually to a white heat, which thereafter tends to fix the hydro-carbon gas passed through it; and from the chamber C the hot gas passes below the diaphragm $l$ into the retort-chamber D, heating the retorts therein and generating coal-gas from their contents. From the retort-chamber the gas, reduced in temperature by imparting heat to the retorts, passes over the diaphragm $k$ through the heat-storage or checker chamber C', eventually raising and maintaining the latter at a white heat, which still further fixes the hydro-carbon-gas product passing through it. From the chamber C' the gas may be passed through the hydraulic main L, wherein it is cooled and purified of coal-tar and ammoniacal vapors. If this product is to be used for heating purposes, it may be led through a pipe $h^5$, branching from the ascension-pipe $h$ (then having its valve $w^2$ closed) to the point of consumption or storage. The coal gas from the retorts H passes, as it is generated, through the pipes $i$ or $i'$ into the hydraulic main I or K, wherein it is cooled and purified of coal-tar and ammoniacal vapors; and it, also, if designed for illuminating purposes, may be led through the outlet-pipes $d$, $c$ directly to the point of consumption or storage. Of course, for further purification, the gas will be passed, on its way to the point of consumption or storage, through washers or scrubbers; but this detail is not herein illustrated, as it presents no feature of novelty.

To produce the compound of hydro-carbon and coal gases, and thus a gas rich in carbon and hydrogen, with resultant great illuminating and heating properties, the proper valves are turned to cause the gas from one hydraulic-main L to enter and mix with that in the hydraulic main K or I whence it is conducted off through the pipe $c$, or $d$, as the case may be.

If it be desired to produce from the generator A' a gas rich in hydrogen, that may be done by closing the pipe $w$ and admitting the intensely heated hydro-carbon gas from the checker-chamber C' up through one or the other (depending on which set of retorts is in operation) of the iron-scrap and charcoal containing chambers M, M', whence the gas will emerge and be conveyed to the point of use or storage through pipes $g'$, $c$, or $g$, $d$. The refractory material in the chambers M, M', heated by the gas from the checker-chamber C', operates as a heat-storage medium to maintain the required incandescent state of the charcoal, whereby sufficient of its carbon shall be burned out to adapt it to take up the carbon-constituent of the hydro-carbon gas and convert the latter the more into a hydrogen gas. The accumulation of coal-tar deposits in the several hydraulic mains overflows into the manifold $h^2$ whence the pump P conveys the coal-tar to the holder G, from which it may be forced by the steam from the branch steam-pipe leading into its top and the steam-jet $p'$, into the chamber $A^2$ to supply hydro-carbon thereto.

It should be suggested that the capacity of my improved apparatus may be increased without proportionately increasing the dimensions by multiplying the number of generators A and other parts about a single retort-chamber.

What I claim as new, and desire to secure by Letters Patent, is—

1. In a gas-apparatus, the combination of a hydro-carbon gas generator, a checker-chamber C communicating therewith, a retort-containing chamber separated from the said checker chamber by a diaphragm $l$ having a lower passage $l'$ through it, a checker-chamber C' separated from the retort-containing chamber by a diaphragm $k$ having an upper passage $k'$ through it, and gas-cooling and purifying devices into which the hydro-carbon gas and retort-gas are directed, substantially as described.

2. In a gas-apparatus, the combination of a hydro-carbon gas-generator A' having a magazine E surmounted by a hopper and surrounded by a boiler F in the chamber $A^2$, but having no communication with a magazine, a steam-pipe leading from the outer end of the boiler into the chamber $A^2$, a retort-containing chamber D, communicating with the chamber $A^2$, and gas-cooling and purifying devices into which the hydro-carbon gas and retort-gas are directed, substantially as described.

3. In a gas-apparatus, the combination of a hydro-carbon gas generator A' having a magazine E surmounted by a hopper and surrounded by a boiler F in the chamber $A^2$, a steam-pipe leading from the outer end of the boiler into the chamber $A^2$, a hydro-carbon holder G into which the steam-pipe branches and having an outlet-pipe $o$ forming with the said steam-pipe an injector, a retort-containing chamber D communicating with the chamber $A^2$, intercommunicating gas cooling and purifying devices into which the hydro-carbon gas and retort gas are directed, and a pump P communicating with the overflow outlets of the said devices and with the holder G, substantially as described.

4. In a gas-apparatus, the combination of a hydro-carbon generator A', a retort-chamber D communicating therewith, one or more retorts in the chamber D, one or more cooling and purifying devices into which the retort-gas is directed, and one or more chambers containing refractory material and charcoal and communicating with the hydro-carbon gas generator from beyond the retort-containing chamber, substantially as and for the purpose set forth.

5. A gas-apparatus comprising, in combination, a hydro-carbon gas generator A' having a chamber $A^2$ into the base of which lead tuyeres $n$ and provided in its upper portion with a magazine E surmounted by a hopper and surrounded by a boiler F, a steam-pipe leading from the outer end of the boiler into the chamber $A^2$, a hydro-carbon holder G into which the steam-pipe branches and having an outlet-pipe $o$ forming with the said steam-pipe an injector, a checker-chamber C adjacent to and communicating with the chamber $A^2$, a retort-chamber D adjacent to the said checker chamber and separated therefrom by a diaphragm $l$ having a lower passage $l'$, a checker-chamber C' adjacent to the retort-chamber and separated therefrom by a diaphragm $k$ having an upper passage $k'$, sets of retorts H having removable caps at their upper and lower ends and connected in transverse pairs from their upper end by pipes $i$, $i'$, leading to opposite sides of the structure, hydraulic mains I and K having gas-outlets and into which the pipes $i$, $i'$, lead, a hydraulic main L having a gas-outlet and connected with the checker-chamber C' and with the other said hydraulic mains, chambers M and M' containing scrap-iron and charcoal, and connected with the checker-chamber C', and provided with gas-outlets, overflow-outlets leading from the said hydraulic mains to a manifold $h^2$, and a pump P communicating with the manifold and holder G, the whole being constructed and arranged to operate substantially as described.

JEANNOT W. KENEVEL.

In presence of—
M. J. FROST,
W. W. WILLIAMS.